United States Patent Office

3,005,778
Patented Oct. 24, 1961

3,005,778
COMPOSITION FOR REMOVING CARBON AND SLUDGE FROM INTERNAL COMBUSTION ENGINES
John Richard Sweetman, Paterson, N.J., assignor to Petro Chemical Laboratories, Inc., New York, N.Y., a corporation of Louisiana
No Drawing. Filed Mar. 2, 1956, Ser. No. 568,965
4 Claims. (Cl. 252—170)

This application is a continuation-in-part of my earlier abandoned applications Serial No. 113,666, filed September 1, 1949, and Serial No. 206,725, filed January 18, 1951.

This invention relates to compositions removing carbon, rust and sludge from metallic parts and it has for its primary object a composition containing an aldehyde or aldehydes and a highly refined mineral oil which will remove carbonaceous, tarry, gummy and sticky residues and oxidation products deposited on metallic parts, including deposits produced before or during the burning of fuel in an engine, which composition will moreover currently prevent the deposition of residues and the corrosion of metallic parts when applied during the operation of the engine.

A further object of the invention is to provide a composition which shows an extraordinary penetration power and which therefore can be employed in many ways, its use in connection with an internal combustion engine being one of the many applications.

It is a further object of the invention to provide a composition which may especially be used for the removal of rust and sludge or of carbonaceous and other deposits from steel objects such as steel pipes, engine valves for all types of engines, etc. and which may be used to unlock frozen bolts or nuts and to free metallic parts which have become locked or bonded by chemical changes of the surfaces in contact with each other.

When used in the way above described for removing deposits or for unfreezing frozen parts or objects, the compound is applied by spraying, painting, pouring or by soaking a textile material in the compound which is then afterwards used for wiping the metallic surfaces to be treated or by otherwise depositing the composition on the parts to be treated.

When used in connection with internal combustion engines the composition may be applied when the engine is not working or is disassembled and it is then applied in the manner above described, or it may be used as an addition to the fuel. In both cases, a composition according to the invention will remove deposits of carbon, of lead and of gummy, resinous, sticky or tarry residues, even after these deposits have been hardened at the temperature at which the engine is run. Further, the addition not only prevents further deposits effectively, but improves the lubricating faculty of the lubricating oil, reduces friction and, in all probability, also adds to the completeness of combustion as a large number of experimental runs with internal combustion engines shows that the fuel consumption of the engine is markedly reduced by the addition and that conversely a predetermined quantity of fuel when provided with the addition keeps the engine running for a longer time under the same load conditions, etc.

According to the invention the composition comprises an aldehyde or a plurality of aldehydes, which may be an aliphatic or an aromatic aldehyde which is added to a highly refined mineral oil of a pH substantially 7 of the paraffin series. The percentage of the aldehyde with which this mixture begins to be effective varies between a very small fraction of 1% of the aldehyde to about 8%, the effectiveness usually ceasing to increase after 6%. Solvents such as xylol (xylene), naphtha, toluol or similar solvents may be added to thin down the oil or to assist in igniting the oil when the composition is used in addition to the fuel in an internal combustion engine, or to improve the detergent effect of the composition in certain cases.

It has already been proposed to use a mixture of furfuryl aldehyde and furfuryl alcohol alone or in combination with benzol and alcohol as a sludge remover. However, since the furfuryl compounds polymerize easily at the operating temperature of internal combustion engines the use of this composition results in the deposition of a tough resin on the parts carrying the carbon deposits on the rusted parts. Thereafter removal of carbon is imperfect on account of these deposits and further deposits are not prevented.

It has also been proposed to use pure benzaldehyde as a low temperature lubricant for the bearings of vehicles or to use a mixture of a lubricating oil with benzaldehyde as a lubricant for vehicle bearings at such temperatures. While such a mixture may be suitable for bearings it has been found that a mixture of benzaldehyde with ordinary lubricating oil is unsatisfactory with respect to carbon or sludge removal for reasons which are stated below.

The removal of carbonaceous and other deposits, as well known, is a problem which is of major importance in the case of internal combustion engines where continuously hard and solid deposits are formed which, when allowed to accumulate, lead to malfunction and even to inoperability of the engine. Also, it is known that internal combustion engines, especially those operating with high octane gasoline, but also those used as vehicle engines especially those used on trucks, or like vehicles, show lead deposits which are partly the result of lead compounds carried by the gasoline due to certain refining methods, and partly are due to so-called antiknock additives to the gasoline.

The problem of removing such deposits may be carried out in two ways. One of them consists in the current removal during operation. This is the ideal type of removal for these deposits and the advantage of this type of removal is so clear that even a partial current removal will be of the greatest importance.

Another method consists in the removal of the deposits after disassembling the engine. The deposits under the influence of heat harden to such a degree that they can usually not be removed by mechanical means without damage to parts of the engine.

Among those deposits which are most difficult to remove is the lead deposit. No satisfactory method for the removal of lead deposits has so far been found.

The object of the invention is therefore to produce a composition which has a combination of different effects all of which are of great advantage, thus making the combination not only applicable in many fields, but producing with the main effect also a number of important side effects.

The composition according to the invention must be suitable to perform at least two functions, one of which consists in the removing of the various solid residues and deposits subjected to relatively high temperature during the operation of the engine. This residue cleaning composition must therefore be introduced into the engine with the fuel and must act while the fuel is burned, expands and is exhausted. A second function consists in penetrating the carbonaceous residue which has formed on the walls of the cylinders and pistons of the engine to such a degree that the extremely hard burned residue which firmly adheres to the metal of the engine is softened and thus becomes separable by a simple cleaning or wiping operation. This last named type of removal is produced when the engine is at rest or disassembled.

The invention performs both these functions and in some of its modifications performs these functions also for lead deposits for which so far no completely satisfactory removing method has been found.

The above results are essentially obtained by means of mixtures of mineral oil and/or solvents with aldehydes either of the aliphatic or the aromatic series of a high boiling point above 150° C. such as benzaldehyde, cinnamic aldehyde, anisic aldehyde, salicylic aldehyde etc. or by means of essential oils containing aldehydes. In addition to the above aldehydes, phenyl acetaldehyde, phenylpropyl aldehyde, p-isopropyl-benzaldehyde, amyl cinnamic aldehyde are especially effective.

Aldehydes which contain water, such as formaldehyde and acetaldehyde and aldehydes which polymerize easily, such as furfural, are not usable for the removal of deposits. The high boiling point is necessary especially for those sludge removing compositions which are to be introduced with the fuel.

Describing the composition in detail, the mineral oil which is used may be an oil of the paraffin series; it must be free of coloring material and odor and must be completely free of gum producing materials. It is essential that the oil be of the description contained in the U.S. Pharmacopoeia XIII, page 395 and page 396, or in the National Formulary, page 376, and it must pass all the tests mentioned in the U.S.P.

A most important further condition is that the pH of the mineral oil must be either exactly 7 (neutral) or extremly close to neutral and should not deviate from the neutral point by more than .1 point in either direction. The permissible variation of the pH should therefore be between 6.9–7.1. The above pH of the oil must exist before the aldehyde is added.

In a series of tests it has been found that the above conditions are most critical. The addition of aldehyde to a mineral oil such as commercially available, for instance, to lubricating oil as used for the lubrication of machinery invariably increases the viscosity and in most cases imparts to the oil a sticky character, especially under the influence of heat, sometimes leading to a sticky gum-like deposit on the surfaces which are lubricated. Such oil after the addition cannot be used for normal lubricating purposes. Therefore, aldehydes are and have been considered as being detrimental. If found to be present they are usually removed to avoid the formation of a resinous product (cf. Ellis, Chemistry of Petroleum Products and Derivatives, page 984).

However, applicant has found that under the above conditions which are, however, extremely critical no resinous condensation products may be formed. If a mineral oil is highly refined, to the extent indicated in the U.S.P. or in the National Formulary, the refining has removed all the unsaturated aliphatic, naphthenic and aromatic hydrocarbons from the mineral oil, leaving only saturated hydrocarbons. The viscosity of the oil was found not to be an important factor for the present invention. The viscosity therefore may be that stated in U.S.P. XIII.

This was proved by the following test. If to a completely neutral oil of pH=7, 2% of NaOH is added and if thereafter only the aldehyde (½% in this test) is added it can be seen that resin and tar formation occurs. Likewise it can be observed that such resin formation occurs upon addition of 2% of an acid.

However, when the mixture of a completely neutral refined mineral oil (pH=7) and an aldehyde is added, either to a commercial lubricating oil or to a commercial gasoline or diesel oil, this addition does not provoke a deposit, a fact which is of great importance and which is connected with the stabilized condition of the mixture.

It has for instance been found by tests that if 8% of an aldehyde or of a mixture of aldehydes is added to an oil, such as commercially available, and a solvent, even if only one ounce of said mixture is added to 5 gallons of fuel (gasoline) the performance of a motor supplied with this mixture is at first excellent and also carbon is removed. Twenty-four hours later, however, the aldehyde still continues the reaction with the oil or the fuel with the result that it is impossible to start such a motor.

With phenyl acetaldehyde such a reaction after twenty-four hours can already be observed if 1% of phenyl acetaldehyde is added. The addition of the aldehyde to commercial oil and the addition of this mixture to ordinary gasoline somehow changes the evaporation point and the flash point.

If, however, oil which is absolutely neutral has been used and if the oil has been refined to the extent above mentioned, once the oil, solvent and aldehyde have reacted for twenty-four hours at room temperature, complete stability has been reached and the mixture can be added to any oil or to any fuel. No further change will result in the oil so that the cleaning and sludge removing and the lowering of the coefficient of friction is no longer accompanied by the above mentioned disadvantages.

It is therefore clear that upon addition of an aldehyde or of aldehydes to a mineral oil some kind of an oxidation process occurs also in the refined mineral oil which is seen from the fact that it is necessary to wait for about twenty-four hours before further tests can be made. Apparently the oxidation stabilizes the refined, neutral oil completely so that thereafter no change occurs.

A further point of extreme importance for the operability of the invention which has been established by numerous tests is that the nature of the vessel in which the mixture is performed has a great influence. It is necessary to make such a mixture either in a glass container or in a stainless steel container. This is probably due to a catalytic action of the metals which have somehow entered the mixture although in very small quantities which are however sufficient to cause an unwanted reaction.

It was found that the type of aldehyde used makes little difference, if aldehydes producing easily gummy products (such as furfural) and further water containing aldehydes such as acetaldehyde or formaldehyde are excluded. The last named aldehydes are also excluded because they have a relatively low boiling point of 110° C. The aldehydes used in internal combustion engines must not only be water free but must also have a high boiling point above 150° C. The water content is a corrosion promoting factor which must be avoided in order not to defeat the purpose of the invention.

Either a single aldehyde or a mixture of several aldehydes may be used. A mixture proved to be of advantage in most cases. For removing lead it is essential that a mixture of aldehydes must be used, one of the aldehydes of the mixture being preferably phenyl acetaldehyde. Instead of the aldehydes also oils containing aldehydes may be used.

The aldehydes which have been extensively tested are benzaldehyde, having a boiling point of 179° C., cinnamic aldehyde having a boiling point of 252° C., oil of cinnamon, oil of cassia (the latter containing up to 85% of aldehydes) having a boiling point of 240° C. and mixtures of these oils, phenyl acetaldehyde, phenyl propyl aldehyde, amyl cinnamic aldehyde, salicylic aldehyde having a boiling point of 196° C., cumic aldehyde having a boiling point of 237° C. and others.

The following aldehydes have been tested and have been found to produce results:

Octyl aldehyde, nonyl aldehyde, decyl aldehyde, undecylic aldehyde, undecylenic aldehyde, lauric aldehyde, myristic aldehyde, clove aldehyde, cocoanut aldehyde, peach aldehyde, anisic aldehyde, spearmint aldehyde, caprylic aldehyde, phenyl propyl aldehyde and others.

The following oils containing aldehydes have also been tested:

Oil of cassia containing 50 to 65% of aldehyde,
Oil of cinnamon containing 80 to 90% of aldehyde,
Oil of anise containing anise aldehyde,
Oil of orange containing 4 to 6% of aldehydes,
Oil of lemon containing 5 to 7% of aldehydes,
Oil of cherry laurel containing benzaldehyde.

If a mixture of aldehydes is prepared it is advisable not to add the aldehydes going into the mixture at the same time. For instance, with a mixture of benzaldehyde and cinnamic aldehyde the benzaldehyde should be added first and the mixture of oil and benzaldehyde should be allowed to stand for about twelve hours or more to complete the reaction which follows the addition. Only after this period has elapsed the cinnamic aldehyde should be added.

In connection with benzaldehyde it is moreover essential to stir the mixture immediately, or otherwise it was found that white flakes consisting of benzoic acid are formed.

For lead removing mixtures phenyl acetaldehyde is preferable. This aldehyde however polymerizes very easily and grows more viscous when standing. It is therefore advisable to add a small quantity of benzyl alcohol which addition stabilizes the phenyl acetaldehyde. After incorporating phenyl acetaldehyde into an oil the oil becomes thickened and its viscosity increases. Preferably xylol is then added which will stabilize the mixture completely.

When phenyl acetaldehyde is added to the mixture it is advisable to depart from the procedure which has been outlined above and to add the phenyl acetaldehyde to one of the aldehydes, for instance, to the benzaldehyde, and to add this mixture of both aldehydes to the oil. Any further aldehyde to be added to the mixture, for instance cinnamic aldehyde should, however, be added later.

The benzaldehyde which is used must be absolutely free from chlorine. As already above stated, the mixture of the aldehyde with a refined oil having a neutral pH still produces a reaction which develops $CO_2$, a fact which can be proved by collecting the gas in a lime solution. This reaction stabilizes the mixture completely. The fact that a reaction of some kind occurs is also evident from the change of the flash point which is quite marked. The refined oil as well as the mixture of the oil with a solvent, such as xylol (xylene), toluol etc. may be flashed at low temperatures (for instance by means of a match), but the mixture cannot be ignited anymore at low temperature after the addition of the aldehyde. While the nature of the reaction has not been determined it may be conjectured that the aldehyde acts as a reducing agent. It has been determined that this reaction ceases only after twelve to twenty-four hours; after this period the mixture is completely stable.

The penetrability and the capability of the mixture to remove sludge, rust or carbon deposits is clearly to be ascribed to the addition of the aldehyde. A paraffin base oil for instance, has very little penetrating power and will not remove rust, sludge or carbon deposits to any marked extent. The mixture of the same oil with an aldehyde produces a very high penetration power which removes as much as 80 to 90% of the deposited carbon at first treatment. The same is also true of the rust and corrosion preventing power.

For instance, a steel object placed into a humidity box containing air of 90% humidity at 70° C. after having been covered with a commercial paraffin oil, starts to show rust or corrosion after five hours. When using instead of the oil a mixture of refined oil with aldehydes or essential oils containing aldehydes or when using a petroleum jelly containing aldehydes with which the object is thereafter covered, there is no trace of any corrosion or of rust after five hours and even after a period which is twice as long no rust or corrosion can be detected.

It has been found that the penetrability and the capability of the composition to remove carbon and other deposits quickly, is materially improved if a solvent such as xylol, benzol, toluol, naphtha solvent, turpentine and similar solvents are added. It is, however, imperative that also the solvent must have a pH=7 or very near the neutral point as otherwise the aldehyde in the solvent, when subjected to heat, produce resinous bodies which, of course, is detrimental for the operation of an engine.

The limits of the effectiveness of the constituents of a mixture of oil and aldehydes expressed in per cents by volume are the following: for most aromatic aldehydes a mixture should contain Aldehydes _____ ½% to 8%.
Solvent _____ 2% to 95% by volume.
Mineral oil _____ 2% to 95% by volume.

The above stated percentage applies, in connection with a mixture of aldehydes, to the mixture and not to the individual aldehydes forming the mixture.

EXAMPLES

Example 1

| | Percent by volume |
|---|---|
| Benzaldehyde | 0.5 |
| Mineral oil | 99.5 |

Example 2

| | |
|---|---|
| Benzaldehyde | 2 |
| Mineral oil | 98 |

Example 3

| | |
|---|---|
| Benzaldehyde | 4 |
| Mineral oil | 92 |
| Xylol | 4 |

Example 4

| | |
|---|---|
| Benzaldehyde | 3 |
| Mineral oil | 95 |
| Xylol | 2 |

Example 5

| | Parts by volume |
|---|---|
| Cinnamic aldehyde | 4 |
| Xylol | 50 |
| Mineral oil | 50 |

Example 6

| | |
|---|---|
| Benzaldehyde | 1 |
| Xylol | 50 |
| Mineral oil | 50 |

Example 7

| | |
|---|---|
| Benzaldehyde | 10 |
| Xylol | 45 |
| Mineral oil | 45 |

Example 8

| | |
|---|---|
| Benzaldehyde | 2 |
| Cinnamic aldehyde | 2 |
| Xylol | 50 |
| Mineral oil | 50 |

Example 9

| | |
|---|---|
| Benzaldehyde | 2–4 |
| Xylol | 50 |
| Mineral oil | 50 |

The composition must be mixed in a stainless steel tank or in a glass tank to avoid any catalyst reaction. In Example 8 the benzaldehyde is first added and only after six to twelve hours the cinnamic aldehyde is added and stirred and the mixture is left standing for twelve more hours for a chemical reaction.

The tests showed that if both aldehydes were added together the cleaning of the motor described below does not progress at the same rate and does not reach the same extent.

*Example 10*

For removing lead deposit in a heavily leaded motor the following mixture was made:

|  | Parts |
|---|---|
| Xylol | 50 |
| Refined mineral oil | 50 |
| Benzaldehyde | 2 |
| Phenyl acetaldehyde | ¼ |

A small quantity of benzyl alcohol was added to the phenyl acetic aldehyde to obtain better stabilization.

*Example 11*

|  | Parts |
|---|---|
| Xylol | 50 |
| Refined mineral oil | 50 |
| Phenyl acetaldehyde | ½ |
| Benzaldehyde | 2 |

*Example 12*

|  | Parts |
|---|---|
| Xylol | 225 |
| Refined mineral oil | 225 |
| Benzaldehyde | 10 |
| Phenyl acetaldehyde plus benzyl alcohol in a 50 to 50 mixture | 10 |

After the benzaldehyde has been added, the mixture should be stirred vigorously and immediately and then stand eight hours. Then the phenyl acetaldehyde should be added. However, as already explained a mixture of benzaldehyde and phenyl acetaldehyde may also be added to the mineral oil-xylene mixture. This mixture is again most effective in removing lead deposits.

*Example 13*

|  | Parts |
|---|---|
| Xylol | 225 |
| Refined mineral oil | 225 |
| Benzaldehyde | 10 |
| Oil of cassia (containing about 83% of cinnamic aldehyde) | 10 |

The first three components are mixed and after 24 hours the 10 parts of the oil of cassia are added.

*Example 14*

| Xylol | parts | 224 |
|---|---|---|
| Refined mineral oil | do | 224 |
| Benzaldehyde | do | 9 |
| Diphenyl amine | grams | 2 |

A highly stable and highly penetrating mixture is obtained by this mixture.

*Example 15*

|  | Parts |
|---|---|
| Xylol | 50 |
| Refined mineral oil | 50 |
| Benzaldehyde | 2 |
| Anise oil (contains anise aldehyde) | 2–4 |

The anise oil is only added 8 hours after the mixture of the other ingredients. The mixture is specially effective when added to the motor fuel of an engine.

*Example 16*

|  | Grams |
|---|---|
| Xylol | 225 |
| Refined mineral oil | 225 |
| Benzaldehyde | 10 |

To 1 pint of this mixture add:
Oil of anise _____ 10

The oil of anise is added after a minimum of 2 hours and preferably only after approximately 12 hours or more. This mixture, like those described in Examples 13, 14, 15 is mainly used for mixtures to be added to the fuel of an engine.

*Example 17*

|  | Parts |
|---|---|
| Xylol | 50 |
| Refined mineral oil | 50 |
| Benzaldehyde | 2 |
| Cinnamic aldehyde | 2 |
| Phenyl acetaldehyde | ¼ |

The oil and the solvent are first mixed; then phenyl acetic aldehyde is added to the benzaldehyde stirring vigorously; this second mixture is then added to the first mixture under stirring. After 4 to 8 hours the cinnamic aldehyde is added. The benzaldehyde must be absolutely chlorine free.

Examples of specially effective detergents:

*Example 18*

|  | Percent by volume |
|---|---|
| Paraffin base mineral oil | 98 |
| Cinnamic aldehyde | 2 |

*Example 19*

| Mineral oil | 95 |
|---|---|
| Oil of cassia (containing 85% of aldehyde) | 5 |

*Example 20*

| Mineral oil | 90 |
|---|---|
| Benzaldehyde | 5 |
| Xylol | 5 |

*Example 21*

| Naphthenic base oil | 96 |
|---|---|
| Xylol | 3 |
| Benzaldehyde | 1 |

*Example 22*

| Paraffin base oil | 90 |
|---|---|
| Xylol | 9 |
| Benzaldehyde | 1 |

*Example 23*

| Refined mineral oil | 91 |
|---|---|
| Xylol | 8 |
| Benzaldehyde | 1 |

*Example 24*

| Refined mineral oil | 95 |
|---|---|
| Xylol | 3 |
| Cinnamic aldehyde | 2 |

*Example 25*

| Mineral oil | 99 |
|---|---|
| Xylol | ½ |
| Mixture of aldehydes (cinnamic, benzaldehyde and others) | ½ |

*Example 26*

| Refined mineral oil | 97 |
|---|---|
| Xylol | 2 |
| Essential oil containing aldehydes | 1 |

*Example 27*

| Mineral oil | 90 |
|---|---|
| Xylol | 9 |
| Anisic aldehyde | 1 |

It was further found that in all those mixtures which contain between 2 and 5% of an aldehyde if in addition 1% of an amine, such as for instance diphenylamine, or aniline, urea or ammonia is dissolved in the oil, preferably before, or after the aldehyde has been added, this mixture is stabilized so that no change can be detected within a number of years. Especially diphenylamine is active in this respect. It is also found that this helps prevent the gum formation in an oil.

As already mentioned the present composition can be employed in a plurality of ways. Frozen or rusted metallic parts such as nuts and bolts, steam valves and other metallic parts may be freed by dipping or soaking them in the various compositions mentioned above by way of example, especially in those stated in Examples 18-27. It will be observed that after a short time, usually about ten minutes, the carbon, rust and sludge is largely removed so that the parts can be readily separated. Likewise, the parts of a disassembled engine may be treated in the same way by soaking them or covering them with a mixture according to the examples above stated. The composition may also be painted or sprayed or otherwise deposited on the metallic parts which are affected.

It is found that after this short time the carbon deposits and other deposits may be easily removed by wiping them off.

As already stated, it is a major problem to keep an internal combustion engine clean and free from deposits and the best method is the addition of a mixture according to one of the examples above enumerated to the fuel. A number of tests were conducted in connection with these additions, some of which are reported below. All test runs showed increase in power, manifesting itself during the test run by an increase of a number of revolutions per minute and by an increase in the length of the time during which the engine would run when provided with a predetermined quantity of fuel to which the mixture was added as compared with the running of the engine with the same quantity of the same fuel without addition of the mixture. Some of the test runs were made after it first had been ascertained that rust, carbon and sludge had been deposited on the movable parts. After the test runs the engine was disassembled and it was found that the deposited carbon, rust and sludge on the movable parts was loosened or removed.

When the mixture was added to the fuel of an engine (gasoline, diesel oil) between 2 parts to 5 parts and sometimes up to 10 parts by volume were added to the fuel.

The following tests were conducted:

(1) The engine was a new 4-cycle Briggs & Stratton one cylinder engine which was provided with means for indicating the number of revolutions and with means for measuring the fuel intake. The latter means consisted of a small measuring container connected with the carburetor.

A number of runs were made with this engine during which a quantity of fuel exactly ten times the contents of the measuring container was consumed. The fuel was commercial gasoline. The engine with the above indicated quantity of this gasoline, ran without load 7 minutes and showed 2100 r.p.m.

Ten parts of a mixture containing 50 parts by volume of high grade mineral oil, 50 parts of coal tar xylol and 2 parts of benzaldehyde were then added to 90 parts of fuel by volume. The runs were again made in the same manner, with the fuel containing 90 parts by volume of gasoline and 10 parts by volume of the above mixture. The motor now in all runs ran 11 minutes with 2300–2400 r.p.m.

(2) 5 milliliters of a mixture containing 50 parts by volume of xylol, 50 parts by volume of oil and 2 parts of benzaldehyde were added to 95 milliliters of the same gasoline, the motor now ran at 2300 r.p.m. for 14 minutes.

(3) With the set up such as described in tests 1 and 2 runs were made adding to 97 parts by volume of gasoline, 3 parts of the following mixture: 50 parts of xylol, 50 parts of refined mineral oil, 2 parts of benzaldehyde to which—after 12 hours as described in the examples—2 parts of cinnamic aldehyde had been added. The motor now ran with 2400 r.p.m. for 17 minutes.

(4) With the same set up a quantity equal to that of 6 containers of regular gasoline, such as commercially available, were now fed to the motor one by one. The results were the following:

The motor ran 9 minutes with 2500 r.p.m., 9 minutes with 2600 r.p.m., 9 minutes with 2700 r.p.m., 9 minutes with 2600 r.p.m., 9 minutes with 2500 r.p.m., 9 minutes with 2600 r.p.m.

After these runs the exhaust was inspected and it was found that it was loaded with carbon deposits.

Now the same quantity of 6 containers of fuel were fed to the motor but the fuel was provided with the addition of 2 parts by volume of a mixture, 98 parts being gasoline. The mixture consisted again of 50 parts by volume of xylol, 50 parts of refined mineral oil and 2 parts of benzaldehyde. The 6 runs were as follows:

The engine ran 11 minutes with 2800 r.p.m., 11 minutes with 2900 r.p.m., 12 minutes with 3000 r.p.m., 13 minutes with 2950 r.p.m., 13 minutes with 3000 r.p.m.

(5) 5 parts of a mixture were added to 95 parts of gasoline; the mixture consisted of 50 parts of xylol, 50 parts mineral oil, 2 parts of benzaldehyde and 2 parts of cinnamic aldehyde; the latter had been added after the mixture of the first 3 components had stood for 12 hours. The motor was run warm before the test was made and the result was the following, adding up the gasoline and averaging the r.p.m.:

With regular commercial gasoline the engine ran with 3000 r.p.m. for 9 minutes; with the above mixture the engine ran with 3700 r.p.m. for 9 minutes and 45 seconds.

Tests 4, 5 were conducted daily for months with invariably the same result.

(6) To equal parts of mineral oil and xylol, ½% of benzylalcohol and ½% of phenyl acetaldehyde were added. Four mixtures between the above mixture and gasoline were prepared.

(1) 1 part of the mixture was added to 99 parts of gasoline.
(2) 2 parts of the mixture were added to 98 parts of gasoline.
(3) 3 parts of the mixture were added to 97 parts of gasoline.
(4) 5 parts of the mixture were added to 95 parts of gasoline.

The gasoline which was used was high octane gasoline (carrying lead compounds) not supposed to be used in a small motor. The consequence was that during these test runs the exposed surfaces of the motor were completely covered with lead.

The time of running with a predetermined quantity (5 containers) was 9 to 10 minutes and the number of revolutions was 3100 r.p.m. when the engine was run with the high test gasoline.

When run with the above mixtures added to the gasoline the time was between 15 to 18 minutes and the engine ran at 3300 to 3600 r.p.m. during the 4 runs. Then the motor was disassembled and inspected and no carbon was found in the motor and no lead was found and the spark plugs were completely clean. The previous inspection had revealed that the spark plugs and the valves and pistons were coated with lead. In all runs whether the mixture containing the phenyl acetaldehyde had been only 1 part or 5 parts of the gasoline the motor proved to be perfectly clean.

Some of the compositions described in the examples were added to the crankcase oil, the amount added being about ½ pint when the crankcase contained about 4 to 5 quarts of oil. Preferably the mixture is added to the oil as well as to the fuel.

The mixture also proved especially suitable for removing the valves in a disassembled engine as a small amount of the composition can be poured on the valves and this is usually sufficient after a time of about 10 minutes to unfreeze the valve so as to permit lifting of the valve by hand.

As already stated above, the composition according to the invention when added to the crankcase oil also improved lubrication and thus adds a further function to the function of removing rust, sludge and carbon deposits, improving the function of the engine in several respects.

The composition has also been tested with refrigeration equipment with butane engines, diesel motors and with other engines or motors. In practical tests it was found that with an addition of ½ pint of the composition to the crankcase oil and of 3 oz. to 15 gallons of the fuel used in trucks no deposition of carbon, rust or sludge could be discovered in the motor after 100,000 miles.

The composition according to the invention may of course be used in different ways and application other than those described hereinabove are possible and are included in the scope of the invention. Although preferred embodiments of the invention have been described it will be evident that minor variations may be made in the composition and the manner of applying the same without departing from the essence of the invention as defined in the annexed claims.

What is claimed as new is as follows:

1. A composition useful for removing carbon, sludge and lead deposits from the combustion chambers of internal combustion engines, comprising in parts by volume, approximately 50 parts of a refined paraffinic mineral oil having a pH between 6.9 and 7.1, approximately 50 parts of a solvent for tarry and gummy substances selected from the group consisting of xylol, toluol, and naphtha, approximately 2–4 parts of benzaldehyde and approximately ¼ to ½ part of phenyl acetaldehyde.

2. A composition useful for removing carbon and sludge from the combustion chambers of internal combustion engines, comprising in parts by volume of 50 parts of a refined paraffinic mineral oil having a pH between 6.9 and 7.1, 50 parts of xylol and 2 to 4 parts of benzaldehyde.

3. A composition useful for removing carbon and sludge from the combustion chambers of internal combustion engines, consisting in parts by volume of 50 parts of a refined paraffinic mineral oil having a pH between 6.9 and 7.1, 50 parts of xylol, 2 parts benzaldehyde and 2 parts cinnamic aldehyde.

4. A composition useful for removing carbon and sludge from the combustion chambers of internal combustion engines, consisting in parts by volume of 50 parts of a refined paraffinic mineral oil having a pH between 6.9 and 7.1, 50 parts of xylol, 2 parts benzaldehyde and 4 parts anisic aldehyde.

References Cited in the file of this patent

UNITED STATES PATENTS

| | | |
|---|---|---|
| 1,248,071 | Bule | Nov. 2, 1917 |
| 1,546,479 | Dennis | July 21, 1925 |
| 1,606,431 | Hamby | Nov. 9, 1926 |
| 2,214,768 | Lincoln | Sept. 17, 1940 |
| 2,251,988 | Curran | Aug. 12, 1941 |
| 2,264,964 | Backoff et al. | Dec. 2, 1941 |
| 2,395,379 | Morgan | Feb. 19, 1946 |

OTHER REFERENCES

Corrosion Handbook, by Uhlig, pp. 910–912, pub. by John Wiley, New York (1948).